(12) United States Patent
Fortini et al.

(10) Patent No.: US 7,415,672 B1
(45) Date of Patent: Aug. 19, 2008

(54) SYSTEM AND METHOD FOR DESIGNING ELECTRONIC FORMS

(75) Inventors: Christian Fortini, Sammamish, WA (US); Jean D. Paoli, Kirkland, WA (US); Laurent Mollicone, Kirkland, WA (US); Bulusu Krishna Mohan, Redmond, WA (US); Alessandro Catorcini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/395,506

(22) Filed: Mar. 24, 2003

(51) Int. Cl.
*G06F 17/21* (2006.01)
(52) U.S. Cl. ...................... 715/760; 715/513
(58) Field of Classification Search ......... 715/853–855, 715/780, 762–763, 771–773, 505–508, 514–516, 715/517, 760, 513, 749, 748, 745, 746, 747, 715/783, 803, 821–822; 717/114; 707/102, 707/104.1
See application file for complete search history.

(56) References Cited

U.S. PATENT DOCUMENTS

| | | | |
|---|---|---|---|
| 4,498,147 A | 2/1985 | Agnew et al. |
| 4,514,800 A | 4/1985 | Gruner et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |

(Continued)

FOREIGN PATENT DOCUMENTS

EP 0 841 615 A2 5/1998

(Continued)

OTHER PUBLICATIONS

Altova, Inc., "XML Spy 4.0 Manual," Altova Inc. & Altova GmbH, coyright 1998-2001, Chapters 1, 2, and 6, encompassing pp. 1-17, 18-90, and 343-362.

(Continued)

*Primary Examiner*—Steven P Sax

(57) ABSTRACT

A system and method enabling a designer to build electronic forms from hierarchical data is described. Displays of hierarchical data, facilitation of selection of a portion of the hierarchical data, and displays of one or more transformation-language components associated with a selected portion of hierarchical data are described. From the transformation-language components selected by a designer, generation of an electronic form is also described.

17 Claims, 11 Drawing Sheets

U.S. PATENT DOCUMENTS

| | | |
|---|---|---|
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,191,797 B1 | 2/2001 | Politis |

| Patent | Date | Inventor |
|---|---|---|
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,281,896 B1 * | 8/2001 | Alimpich et al. ............ 715/781 |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,405,221 B1 | 6/2002 | Levine et al. |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 * | 8/2003 | Jacobs ....................... 707/102 |
| 6,613,098 B1 | 9/2003 | Sorge et al. |
| 6,615,276 B1 | 9/2003 | Mastriann et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |

| | | |
|---|---|---|
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 6,996,781 B1 * | 2/2006 | Myers et al. ................ 715/763 |
| 7,003,722 B2 | 2/2006 | Rothchiller et al. |
| 7,010,580 B1 | 3/2006 | Fu et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,080,325 B2 | 7/2006 | Treibach-Heck et al. |
| 7,086,009 B2 | 8/2006 | Resnick et al. |
| 7,088,374 B2 | 8/2006 | David et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,152,205 B2 | 12/2006 | Day et al. |
| 7,190,376 B1 | 3/2007 | Tonisson |
| 7,191,394 B1 | 3/2007 | Ardeleanu et al. |
| 7,281,018 B1 | 10/2007 | Begun et al. |
| 7,296,017 B2 | 11/2007 | Larcheveque et al. |
| 2001/0007109 A1 | 7/2001 | Lange |
| 2001/0022592 A1 * | 9/2001 | Alimpich et al. ............ 345/781 |
| 2001/0024195 A1 | 9/2001 | Hayakawa |
| 2001/0037345 A1 | 11/2001 | Kiernan |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0013788 A1 | 1/2002 | Pennell et al. |
| 2002/0023113 A1 * | 2/2002 | Hsing et al. ................ 707/513 |
| 2002/0026441 A1 | 2/2002 | Kutay |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reymar et al. |
| 2002/0040469 A1 | 4/2002 | Pramberger |
| 2002/0054128 A1 * | 5/2002 | Lau et al. .................... 345/781 |
| 2002/0057297 A1 | 5/2002 | Grimes et al. |
| 2002/0065798 A1 | 5/2002 | Bostleman et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 * | 10/2002 | Holbrook ................ 707/104.1 |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay |
| 2002/0174147 A1 | 11/2002 | Wang et al. |
| 2002/0174417 A1 | 11/2002 | Sijacic et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr et al. |
| 2003/0004951 A1 | 1/2003 | Chokshi |
| 2003/0007000 A1 * | 1/2003 | Carlson et al. .............. 345/713 |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0033037 A1 * | 2/2003 | Yuen et al. .................... 700/86 |
| 2003/0037303 A1 | 2/2003 | Bodlaender |
| 2003/0043986 A1 | 3/2003 | Creamer |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al |
| 2003/0056198 A1 | 3/2003 | Al-Azzawe |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 * | 6/2003 | Kim et al. .................... 707/200 |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0204511 A1 | 10/2003 | Brundage |
| 2003/0204814 A1 | 10/2003 | Elo et al. |
| 2003/0205615 A1 | 11/2003 | Marappan |
| 2003/0212664 A1 | 11/2003 | Breining et al. |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |

| | | |
|---|---|---|
| 2003/0225829 A1 | 12/2003 | Pena et al. |
| 2003/0226111 A1 | 12/2003 | Wirts et al. |
| 2003/0226132 A1* | 12/2003 | Tondreau et al. ............ 717/116 |
| 2003/0233374 A1 | 12/2003 | Spinola et al. |
| 2003/0236859 A1 | 12/2003 | Vaschillo et al. |
| 2003/0237046 A1 | 12/2003 | Parker et al. |
| 2003/0237047 A1 | 12/2003 | Borson |
| 2004/0002939 A1 | 1/2004 | Arora |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0163041 A1 | 8/2004 | Engel |
| 2004/0172442 A1 | 9/2004 | Ripley |
| 2004/0186762 A1* | 9/2004 | Beaven et al. ............... 705/8 |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1* | 10/2004 | Friedman et al. ............ 707/102 |
| 2004/0221238 A1 | 11/2004 | Cifra et al. |
| 2004/0221245 A1* | 11/2004 | Chickles et al. ............ 715/854 |
| 2004/0237030 A1 | 11/2004 | Malkin |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015732 A1 | 1/2005 | Vedula et al. |
| 2005/0022115 A1* | 1/2005 | Baumgartner et al. ....... 715/513 |
| 2005/0027757 A1 | 2/2005 | Klessig et al. |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0138086 A1 | 6/2005 | Pecht-Seibert |
| 2005/0171746 A1 | 8/2005 | Thalhammer-Reyero |
| 2005/0198086 A1 | 9/2005 | Moore |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0240876 A1* | 10/2005 | Myers et al. ................. 715/763 |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1* | 2/2006 | Chickles et al. ............. 717/109 |
| 2006/0041838 A1 | 2/2006 | Khan |
| 2006/0059434 A1 | 3/2006 | Boss et al. |
| 2006/0069605 A1 | 3/2006 | Hatoun |
| 2006/0069985 A1* | 3/2006 | Friedman et al. ............ 715/513 |
| 2006/0085409 A1 | 4/2006 | Rys et al. |
| 2006/0143220 A1 | 6/2006 | Spencer, Jr. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 63085960 | 4/1988 |
| JP | 401173140 | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO0157720 | 8/2001 |
| WO | WO0157720 | 3/2006 |

OTHER PUBLICATIONS

Cybook, Inc.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

OMG XML Metadata Interchange (XMI) Specification Version 1.2 Jan. 2002.

Baraband et al., PowerForms: "Declarative Client Site Form Field Validation", World Wide Web, Baltzer Science Publishers, Bussum, NL. vol. 3, No. 4, Dec. 2000, p. 1-20.

Cover, XML, Forms Architecture, retrieved at <<http://xml.coverpages.org/xfa.html>> on Aug. 17, 2006, Coverpages, Jun. 16, 1999.

Microsoft Corporation, "Microsoft Computer Dictionary" Microsoft Press, Fifth Edition, p. 149.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-2.

"Webopedia Computer Dictionary" retrieved on May 9, 2006, at <<http://www.pewebopedia.com/TERM/O/OLE.html>>, Jupitermedia Corporation, 2006, pp. 07.

Richard Scott Hall, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

Arthur Van Hoff et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Linnea Dayton and Jack Davis, "Photo Shop 5/5.5 WOW! Book," 2000, Peachpit Press, pp. 8-17.

Sara Williams and Charlie Kindel, "The Component Object Model: A Technical Overview," Oct. 1994, Microsoft Corp., pp. 1-14.

Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, T., "Generic Validation of Stuctural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator: A Constraint Validator for XML," CIKM '02, Nov. 4-9, 2002, Copyright 2002, ACM 1-58113-492-4/02/0011, pp. 446-452.

W. Brogden, "Arboetext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.

L Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

A. Davidow, "XML Editors: Allegations of Functionality in search of reality," Internet, 'Online! 1999, XP002230082, retrieved from the Internet, <URL:http://www.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthavibul, et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002. pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," http://www.eweek.com/article2/0,3959,724041,00.asp, Nov. 25, 2002, 2 pages.

"Netscape window" Netscape Screenshot, Oct. 2, 2002.

Jan-Henrick Haukeland: "Tsbiff—tildeslash biff—version 1.2.1" Internet Document, [Online] Jun. 1999, URL:http://web.archive.org/web/19990912001527/http:www.tildeslash.com/tsbiff/.

Atova, "User Reference manual Version 4.4, XML Spy suite 4.4," Atova Ges.m.b.H & Altova, Inc., May 24, 2002, pages cover, copyright p. 1-565.

Altova et al. XML Spy, XML intergrated Development Enviroments, Altova Inc., 2002, pp. 1-18.

Ben-Natan, U.S. Appl. No. 60/203,081, filed May 9, 2000, entitled "Internet Platform for creating and supporting communities".

Ixia Soft, "Steamlining content creation, retrieval, and publishing on the Web using TECTML Server and SML Spy 4 Suite In an Integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1989-1999, Three pages.

Moore, U.S. Appl. No. 60/191,662, filed Mar. 23, 2000, entitled "Collection-based presistent digital archives".

Clark, James, Ed.; "XSL Transformation (XSLT) Version 1.0", Nov. 16, 1999, W3C (MIT, INRIA, Keio), pp. 1-156.

Clark, James and Steve Derose, "XML Path Language (XPath) Version 1.0", Nov. 16, 1999, W3C (MIT, INRIA, Keio), pp. 1-49.

Musgrave, S., "Networking technology—impact and opportunities", Survey and Statistical Computing 1996. Proceedings of the Second ASC International Conference. Sep. 1996. pp. 369-378. London, UK.

Rapaport, L., "Get more from SharePoint", Transform Magazine, vol. 11, No. 3, Mar. 2002, pp. 13, 15.

McCright, J.S., "New Tool Kit to Link Groove with Microsoft SharePoint", eWeek, Enterprise News & Reviews, Ziff Davis Media Inc., Jul. 29, 2002, 1 page.

U.S. Appl. No. 60/209,713, filed Jun. 5, 2000.

Clarke, P., "From small beginnings," Knowledge Management, Nov. 2001, pp. 28-30.

Description of Whitehill Composer software product, produced by Whitehill Technologies, Inc., available at <http://www.xml.com/pub/p/221>, accessed on Apr. 8, 2004, two pages.

Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.

Noore, A., "A Secure Conditional Access System using Digital Signature and Encryption," International Conference on Consumer Electronics, Jun. 2003, pp. 220-221.

Pacheco, X., et al., "Delphi 5 Developer's Guide," Sams Publishing 1999, Section: Data Streaming, 6 pages.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.
"Microsoft Word 2000", Screenshots,(1999), 1-5.
Adams, Susie, et al., "BizTalk Unleashed", Sams publishing, 2002, first printing Mar. 2001, 1-2, 31-138.
Anat, Eyal , et al., "Integrating and Customizing Hererogeneous E-Commerce Applications", The VLDB Journal-The International Journal on Very Large Data Bases, vol. 10, Issue 1,(Aug. 2001),16-38.
Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Borland, Russo , "Running Microsoft Word 97", 314-315, 338, 361-362, 390, and 714-719.
Brabrand, et al., "Power Forms Declarative Client-side Form Field Validation", (2002),1-20.
Dubinko, Micah , "XForms and Microsoft InfoPath", Retrieved from the Internet at http://www.xml.com/lpt/a/1311 on Jan. 21, 2007,(Oct. 29, 2003).
Halberg, Bruce , et al., "Using Microsoft Excel 97", (1997),191-201, 213-219.
Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Lehtonen, Miro , et al., "A Dynamic User Interface for Document Assembley", Department of Computer Science, University of Helsinki,(Nov. 2002).
Nelson, Joe , "Client-side Form Validation Using JavaScript", *Developer Advisory*, (Sep. 21, 2001).
Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan , "Microsoft InfoPath 2003 By Example", Retrieved from the Internet at http://www.perfectxml.com/InfoPath.asp on Jan. 21, 2007,(Apr. 20, 2003).
Udell, Jon , "InfoPath and XForms", Retrieved from the Internet at http://weblog.infoworld.com/udell/2003/02/26.html,(Feb 26, 2003).
Vasters, Clemens F., "BizTalk Server 2000 A Beginner's Guide", Osborne/McGraw-Hill,(2001),1-2, 359-402.
Villard, et al., "An Incremental XSLT Transformation Processor for XML Document Manipulation", http://www2002.org/CDROM/refereed/321, Printed on May 18, 2007,(May 2002),25 pages.
Hwang et al. Micro-Firewalls f; "Micro-Firewalls for Dynamic Network Security with Distributed Intrusion Detection"; IEEE INternational Symposium on Network Computing and Applications; 2001; pp. 68-79.
Kaiya et al. Specifying Runtim; "Specifying Runtime Environments and Functionalities of Downloadable Components Under the Sandbox Mode"; International Symposium on Principles of Software Evolution; 2000; pp. 138-142.
Prevelakis et al. Sandboxing A; "Sandboxing Applications"; Proceedings of the FREENIX Track; 2001; pp. 119-126.
Schmid et al. Protection Data; "Protection Data from Malicious Software"; 18th Annual Computer Security Applications Conference; 2002; pp. 199-208.
Tomimori et al. An Efficient a; "An Efficient and Flexible Access Control Framework for Java Programs in Mobile Terminals"; 22nd International Conference on Distributed Computing Systems Workshops; 2002; pp. 777-782.
U.S. Appl. No. 60/191,662, Kutay et al.
U.S. Appl. No. 60/203,081, Ben-Natan et al.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDAM- Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B. , "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
Description of Whitehill Composer software product producted by Whitehill Technologies Inc. available at <http://www.xml.com/pub/p/221> accessed on Apr. 8, 2004 two pages.
Laura Acklen & Read Gilgen, "Using Corel Wordperfect 9", 251-284, 424-434, 583-586 (1998).
Bruce Halberg et al, "Using Microsoft Excel 97", Published 1997, Bestseller Edition, Pertiment pp. 1-9, 18-25, 85-89, 98-101, 106-113, 124-127, 144-147, 190-201, 209-210, 218-227, 581-590, 632-633, 650-655, 712-714.
Leblond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Han et al., WebSplitter: A Unified XML Framework for Multi-Devixe Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.

* cited by examiner

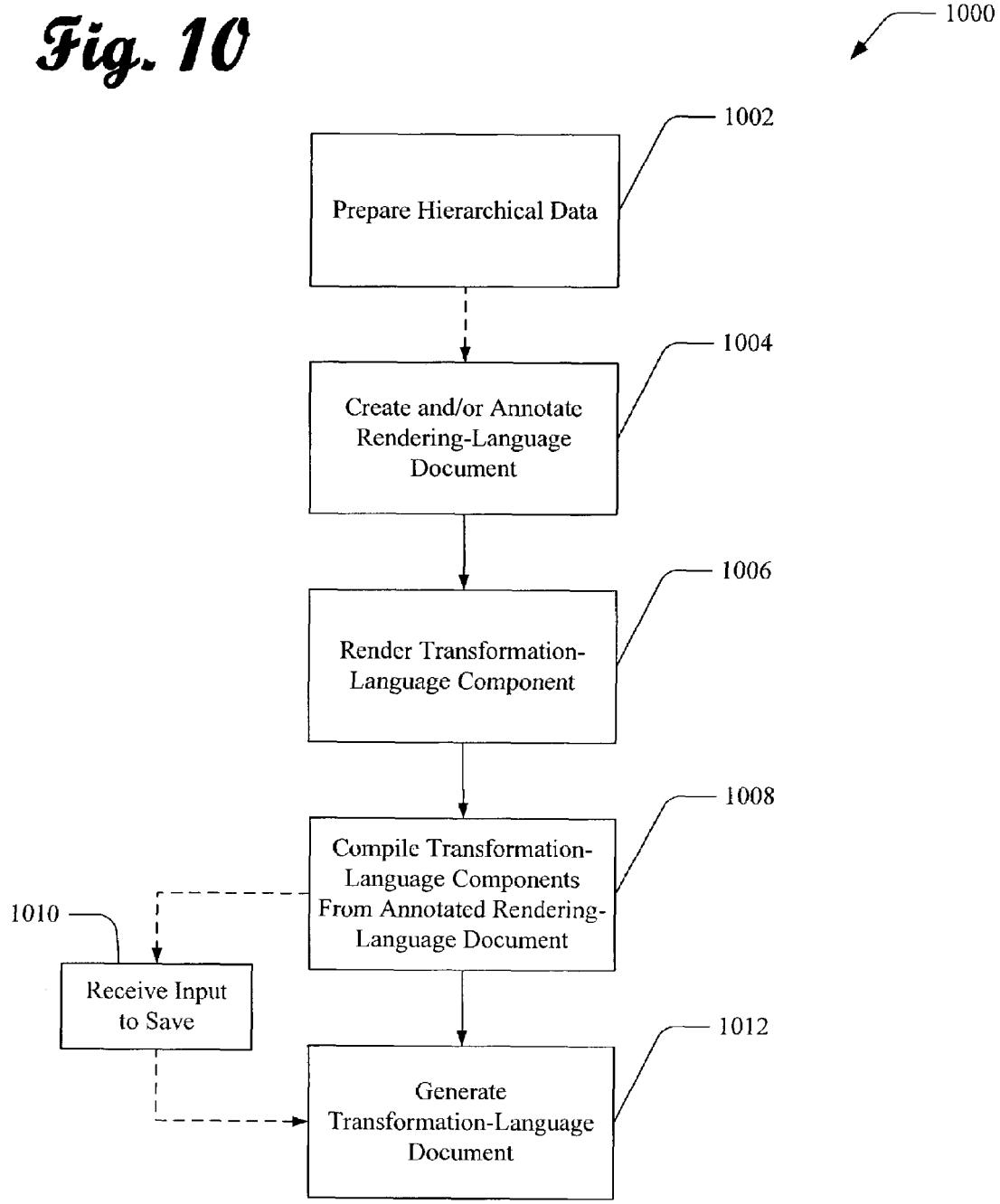

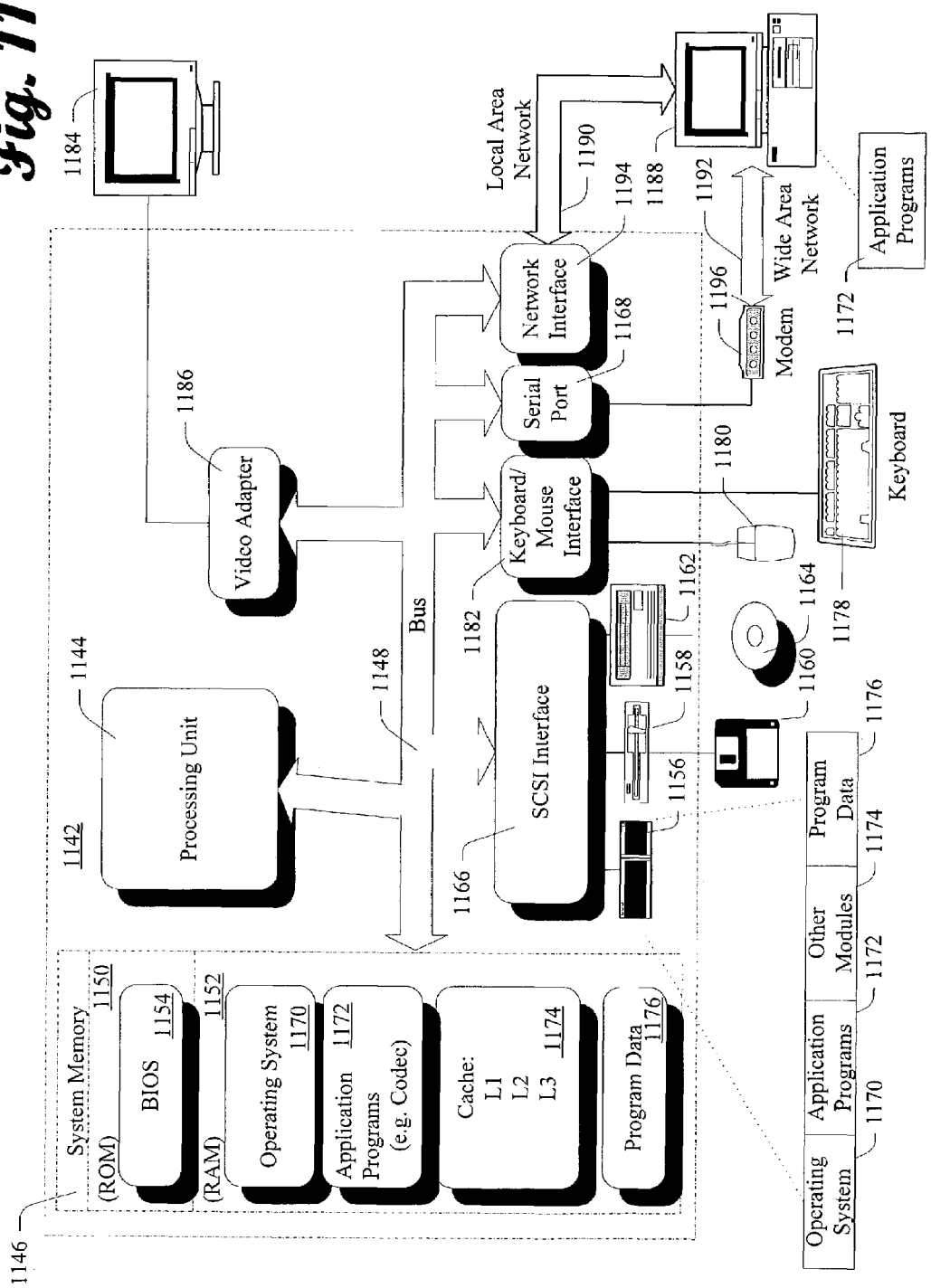

SYSTEM AND METHOD FOR DESIGNING ELECTRONIC FORMS

TECHNICAL FIELD

This invention relates to designing electronic forms, and more particularly, to a user-friendly way to design electronic forms using a visual representation of hierarchical data and a form-designing area.

BACKGROUND

Extensible markup language (XML) is increasingly becoming the preferred format for transferring data. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). XML is well-suited for many types of communication including business-to-business and client-to-server communication. For more information on XML, XSLT, and XSD (schemas), the reader is referred to the following documents which are the work of, and available from the W3C (World Wide Web consortium): XML Schema Part 2: Datatypes; XML Schema Part 1: Structures, and XSL Transformations (XSLT) Version 1.0; and XML 1.0 second edition specification.

With so information being described and transferred through XML, it is increasingly important to have ways to view that information. One way to view information in an XML document is to transform it with an XSLT file into an HTML (or XHTML) document. HTML documents can be used to render, or view, information, such as information from an XML file. Using XSLT, rather than other transforming languages, is often preferred because XSLT is a W3C standard.

One purpose for using an XSLT file to transform an XML document is to create electronic forms. Electronic forms can be used not only to view information within an XML document, but also to allow a user of the electronic form to add, remove, or change information within the XML document by editing data in a data-entry field within the electronic form.

Currently, to create an HTML document (e.g., an electronic form) that renders information within an XML document, a programmer writes an XSLT file to transform the XML document into the HTML document. The programmer, however, must have a high degree of skill in programming XSLT to program an XSLT file, especially to create an electronic form.

Also, even with a high degree of programming skill, programming an XSLT file can be very time consuming and difficult. It can be difficult and time-consuming because an XSLT programmer cannot see the HTML document that he is creating as he is creating it. The programmer, rather, must complete an XSLT file and apply it to an XML file before he cans ee the view created with the resulting HTML document. Even with the view, each mistake made by the programmer, such as the style, layout, and structure of the view, can be very difficult to relate back to the mistake made in the XSLT file, further complicating programming of XSLT files to create HTML documents.

For these reasons, creating electronic forms and other HTML documents by transforming an XML document with an XSLT file is difficult, time consuming, and requires a high degree of skill.

SUMMARY

A system and method enabling a designer to build electronic forms from hierarchical data is described. Displays of hierarchical data, facilitation of selection of a portion of the hierarchical data, and displays of one or more transformation-language components associated with a selected portion of hierarchical data are described. Generation of an electronic form from transformation-language components selected by a designer is also described.

Also, a system capable of and/or a method of coupling a markup-language document and markup-language schema into a generalized instance is described. Receiving a markup-language document or markup-language schema or both and inferring a markup-language document from only a markup-language schema or a markup-language schema from only a markup-language document is described. With a markup-language document and markup-language schema, whether received or inferred, coupling of the markup-language document and the markup-language schema into a generalized instance is described.

BRIEF DESCRIPTION OF THE DRAWINGS

FIG. 10 is a flow diagram of an exemplary process for rendering transformation-language components and generating a transformation-language document.

FIG. 11 is a block diagram of a computer system that is capable of supporting an electronic-form generation process.

The same numbers are used throughout the disclosure and figures to reference like components and features.

DETAILED DESCRIPTION

The following disclosure describes a user-friendly way to design electronic forms using a visual representation of hierarchical data and a form-designing area of a display. Hierarchical data is presented in an area of a display screen, usually presented graphically, such as with an arrangement of icons. Icons represent some part of the hierarchical data and are generally a simplification of the data so that a designer can more easily understand the purpose of and choose from various parts of the hierarchical data. A designer can choose a part or portion of the hierarchical data that he or she wishes to include in an electronic form.

When the designer chooses part of the hierarchical data, such as by clicking on an icon representing part of the hierarchical data, a component representing a way to present that part of the hierarchical data can be placed on a form-designing area. The form-designing area is presented in an area of a display screen, usually appearing as a blank page, such as is often done when viewing a new document in a word-processing application. Components placed in a form-designing area can be manipulated by a designer to allow the designer to make an electronic form look and feel like the designer desires.

For discussion purposes, the visual representation of the data and the form-designing area are described in the context of a single computer, a set of user-input devices, and a single display screen having an area for displaying a representation of the data and another area for displaying the form-designing area. The display screen, computer, and user-input devices will be described first, followed by a discussion of the techniques in which these and other devices can be used.

The Display Screen, Computer, and User-Input Devices

Figure 1:
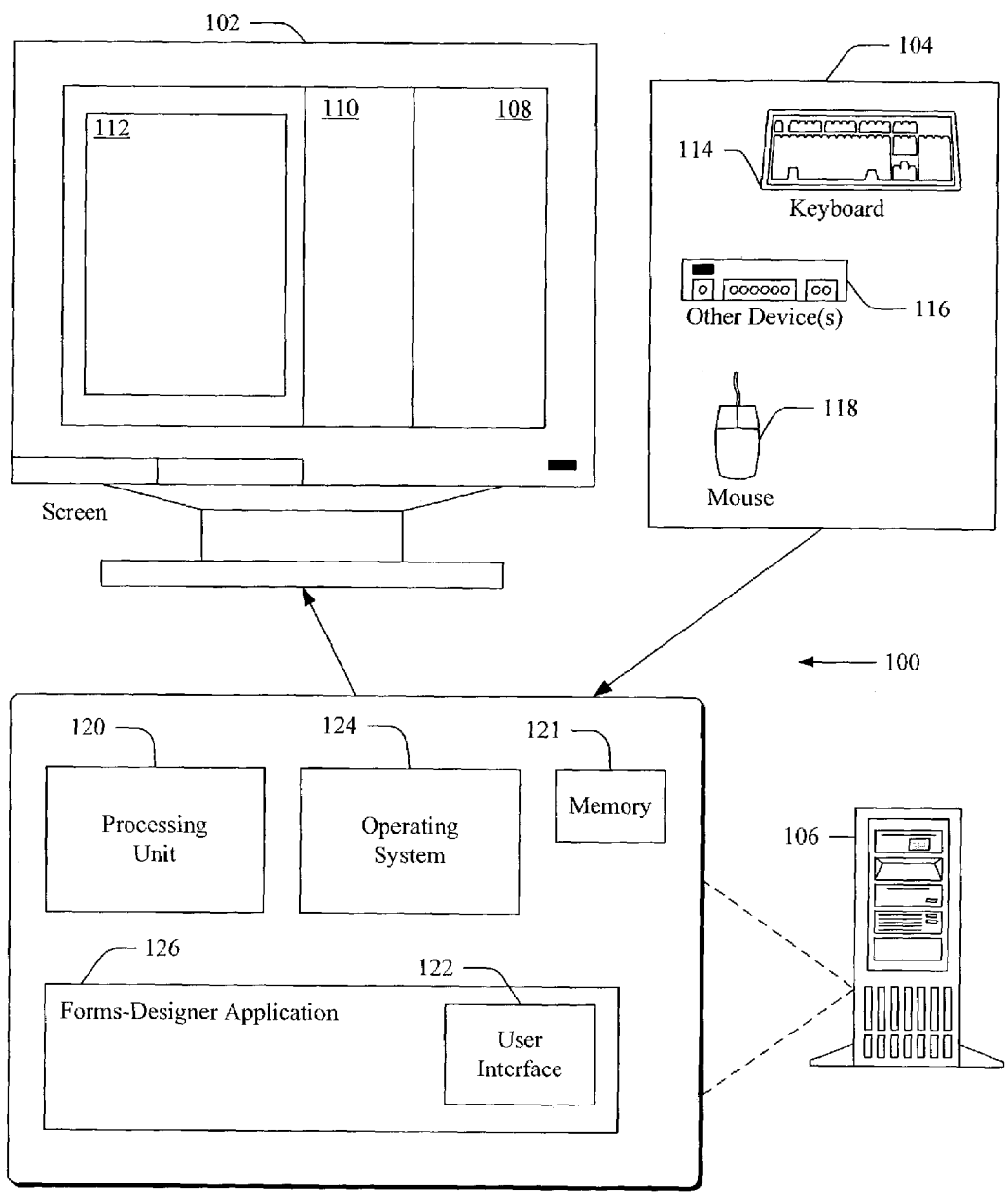
FIG. 1 illustrates a system with a display screen, computer, and user-input devices. The system implements a method for designing electronic forms.

FIG. 1 shows an exemplary system 100 that facilitates creation of electronic forms from a representation of data. The system 100 includes a monitor or screen 102, one or more user-input devices 104, and a computer 106. The user-input devices 104 can include any device allowing a computer to receive a designer s preferences, such as a keyboard 114, other device(s) 116 (e.g., a touch screen, a voice-activated input device, a track ball, etc.), and a mouse 118. The computer 106 includes a processing unit 120 and memory 121, which includes both volatile and non-volatile memory.

An operating system 124 and one or more applications are stored in memory and execute on the processing unit 120. One particular application is a forms-designer application 126, which allows a designer to create electronic forms with little or no programming skill. The forms-designer application 126 provides a visual what-you-see-is-what-you-get (WYSI-WYG) user interface 122 that enables designers to visually construct an electronic form by visually selecting structured data items and arranging them into a form in a manner that is intuitive and straightforward. As the designer builds the form through the user interface, the application 126 enforces the underlying schemas to ensure that the form complies with the intended structure.

The user interface 122 includes three areas depicted on the screen 102: a data display area 108, a component display area 110, and a form-design area 112. The three areas may be shown individually, or in groups of two areas, as desired. The areas 108, 110, and 112 may be implemented as individual graphical windows, such as those supported by Microsoft's Window® operating system. Alternatively, the areas may be panes within a common window, or some other graphical arrangement.

Data display area 108 shows a representation of a data source of hierarchical data. The data may be presented and structured in a number of ways. In one example, the data display area 108 depicts hierarchical data arranged into a tree structure having multiple nodes. From this data display area 108, a designer can select various parts of the hierarchical data to be represented in the form-design area 112 when constructing an electronic form. When the designer selects a certain portion of data in data display area 108, the forms-designer application 126 presents a list of components in the component display area 110 that can be used in the form-design area 112 to represent the selected portion of hierarchical data. The number and type of components in the component display area 110 varies depending upon the hierarchical data that is selected.

The designer can then choose one or more of the components in the component display area 110 and arrange them in a representation of a form being constructed in the form-design area 112. For instance, the designer can drag and drop a component from the component display area 110 (which corresponds to a selected portion of hierarchical data (e.g., node in the data tree) from the display area 108) onto the form-design area 112, and the underlying forms-designer application 126 will show how the selected component will affect the electronic form produced.

Figure 2:
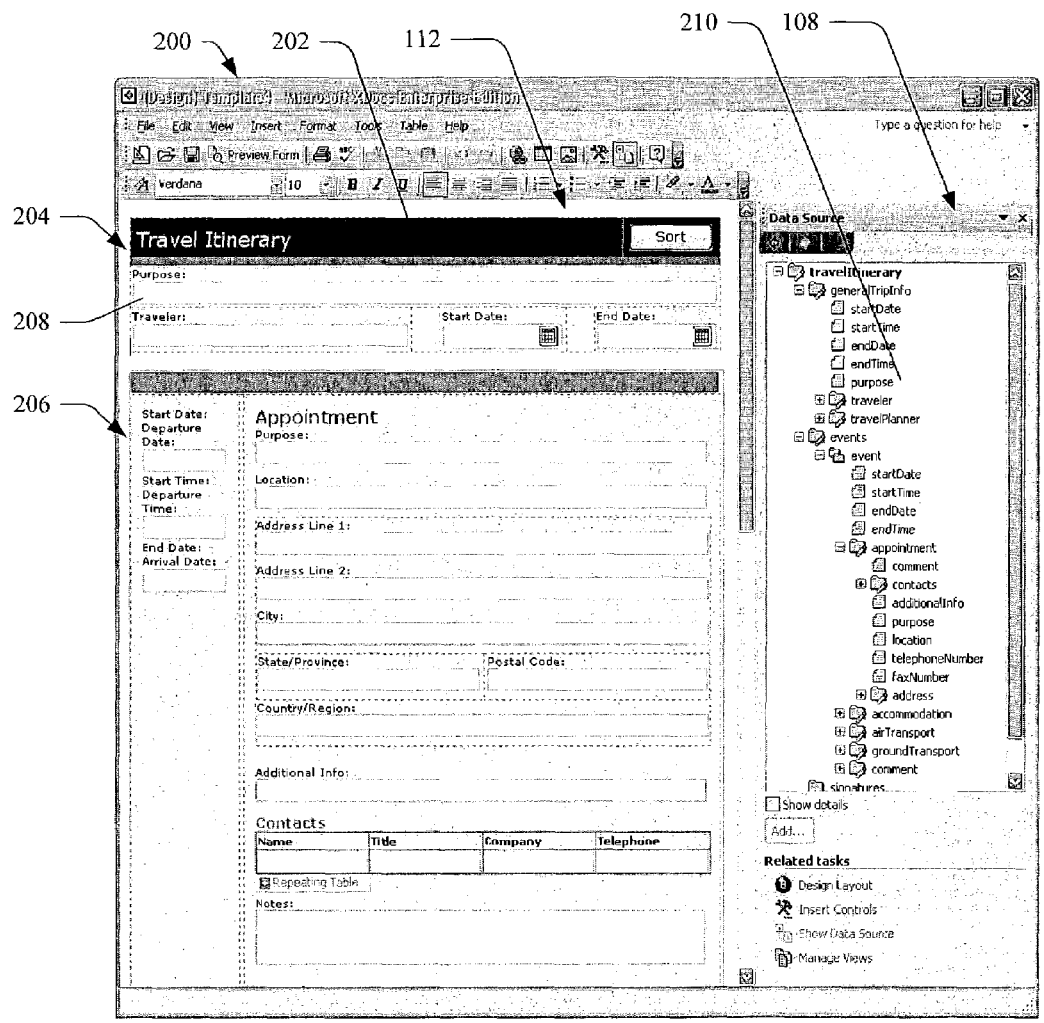
FIG. 2 illustrates an exemplary screen display showing a data display area and a substantially filled-in form-design area.

FIG. 2 shows an example screen display 200 illustrating construction of an electronic form in the form-design area 112 by selection of hierarchical data elements in the data display area 108. In this example, a representation 202 mimics an electronic form being constructed for a fictitious travel itinerary. It has a top section 204 that describes general trip information, having components that represent data-entry fields in the electronic forms, which will allow entry of the purpose of the trip, the traveler's name, and the start and end dates. The representation 202 also has a bottom section 206 for tracking individual appointments made on the trip. In this example, the appointment section 206 will allow such entries as purpose of the appointment, its location, and the people contacted during the appointment.

The representation 202 follows the file of hierarchical data provided in data display area 108. In this example, the hierarchical data file is arranged into a tree structure, which includes a node named "generalTripInfo" that generally corresponds to the top portion 204 of the form, and hierarchical nodes named "event" and "appointment" that generally correspond to the bottom portion 206.

The representation 202 (and, eventually, the electronic form it mimics) can be constructed by selecting nodes in the data tree structure in display area 108 and arranging representative components onto the form-design area 112. For example, to create the "Purpose" entry field representation 208 in the top section 204, the designer selects the purpose node 210 in the data display area 108. The application presents a list of components (not shown in FIG. 2 corresponding to the purpose node 210. The designer then chooses a component and identifies a corresponding location in the form-design area 112 for the component to be placed. One technique for this selection and placement of the component is to drag-and-drop the selected component corresponding to the node 210 onto the desired location, and the forms-designer application 126 will show a representation of how an operable field corresponding to the component will appear in the electronic form.

The process used to build an electronic form from components associated with hierarchical data will be set forth in greater detail below. The above devices and applications are merely representative, and other known devices and applications may be substituted for or added to those shown in FIG. 1. One example of another known device that can be substituted for those shown in FIG. 1 is the device shown in FIG. 11.

Overview of Technique for Creating Electronic Forms

Figure 3:
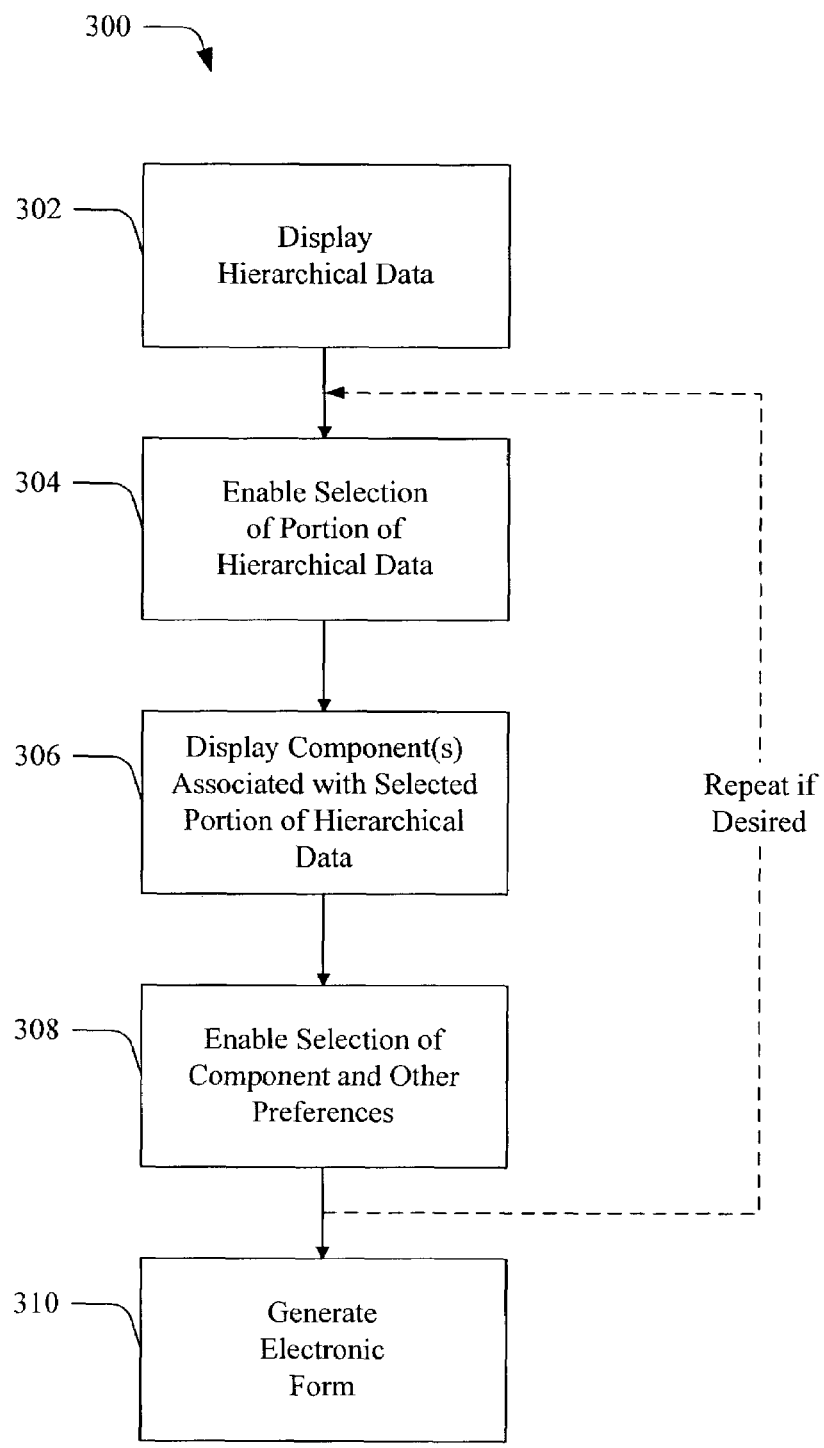
FIG. 3 is a flow diagram of an exemplary process for generating electronic forms.

FIG. 3 shows a process 300 for modularly generating an electronic form. The process 300 is illustrated as a series of blocks representing individual operations or acts performed by the system 100. The process 300 may be implemented in any suitable hardware, software, firmware, or combination thereof. In the case of software and firmware, the process 300 represents a set of operations implemented as computer-executable instructions stored in memory and executable by one or more processors.

Displaying Hierarchical Data

At block 302, the system 100 display hierarchical data. The hierarchical data is displayed so that a designer can chose particular parts of the hierarchical data to be represented in an electronic form that the designer wants to build. The system 100 displays the hierarchical data so that it is easy for the designer to choose a particular part of the hierarchical data, such as by clicking on an icon.

Figure 4:
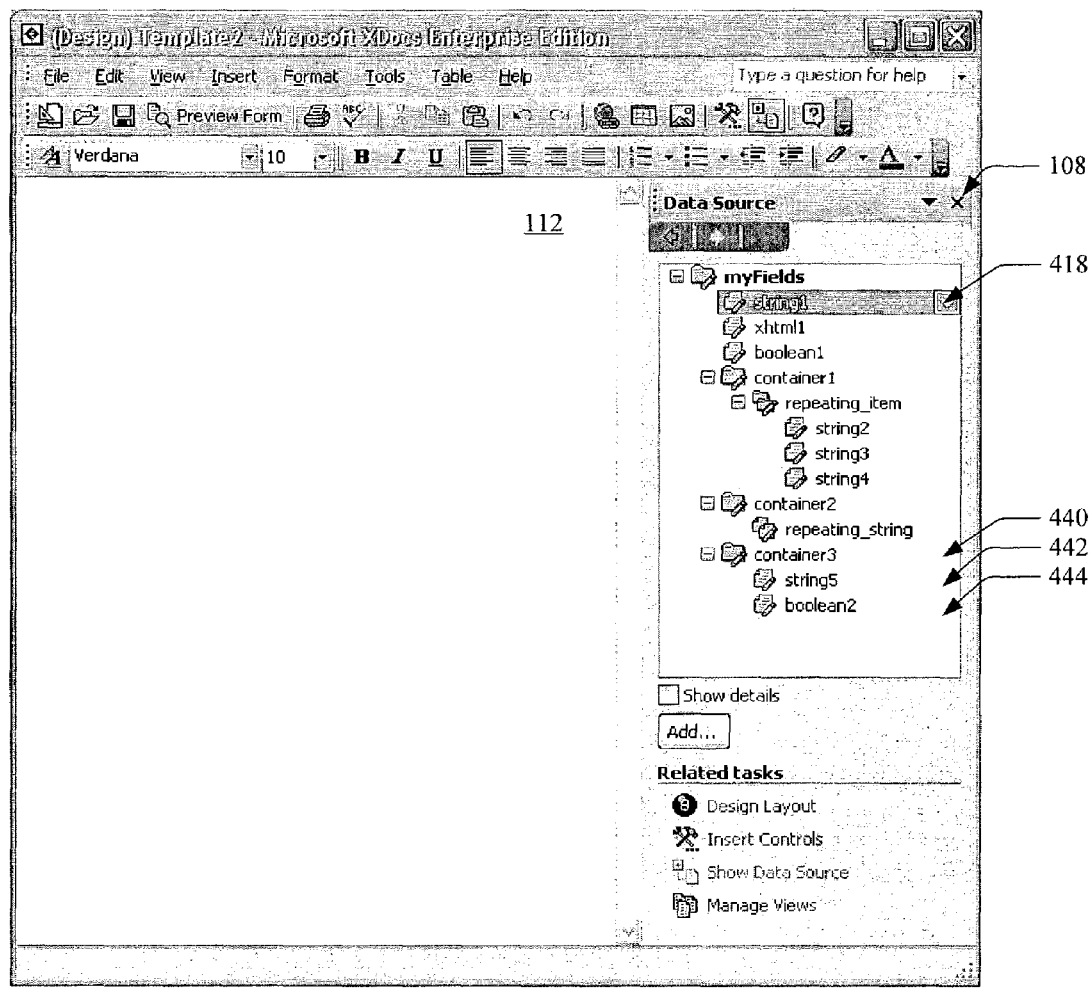
FIG. 4 illustrates an exemplary screen display showing a data display area and a blank form-design area.

FIG. 4 shows an example data display area 108 in which hierarchical data is displayed as icons with associated names. For instance, the depicted data includes such items of data named "myFields," "string1," "xhtml1," "container1," "repeating item," "string1," and so forth to "boolean2". Each of these named icons represents a part of the hierarchical data. These icons make it easier to understand the hierarchical data, especially for a designer unfamiliar with the often-complex details of hierarchical data. These icons can also make it easier for a designer to select particular parts of the hierarchical data. Whether the icons, text, or otherwise, the system 100 makes the structure of the hierarchical data apparent to a designer.

In FIG. 4, the hierarchical data is arranged in the form of a tree. The named icons are representative of nodes in the tree. The tree structure leads a visually hierarchy to the data, where certain nodes are nested within other nodes. For instance, a parent "container3" node 440 contains a "string5" node 442 and a "boolean2" node 444, which is set forth graphically by the "string5" node 442 and the "boolean2" node 444 being indented relative to the "container3" node 440.

Nodes, as well as parts of hierarchical data not presented in a tree, have a structure. This structure can include rules governing the node itself or the type of information that the node can contain.

There are various types of languages with which hierarchical data files are written, such as markup languages. One of the most common types of markup language is the eXtensible Markup Language, or XML. Markup-language data is often used to transfer, store, or represent data.

Selecting a Part or Node of the Hierarchical Data

At block 304, the system 100 enables selection of a portion of the hierarchical data. In FIG. 4, the designer has selected the ¢string1" node 418 as represented by the highlight bar placed at the node. Selection can be made using conventional user interface techniques, such as a computer mouse pointer, a stylus, a touch screen, or some other input mechanism that facilitates selection of a specific item. The designer selects a portion of hierarchical data by clicking on )or tapping, or otherwise identifying) the icon or text name representing a particular part of the hierarchical data.

Components Associated With the Selected Portion

Once the system 100 receives a selection of a portion of the hierarchical data, the system 100 displays one or more components associated with the selected portion of the hierarchical data (block 306 in FIG. 3. The components can be displayed in various ways such that a designer is able to readily choose among possible components (if a choice needs to be made). The components can be depicted in a separate area, such as a separate graphical window or pane.

Figure 5:
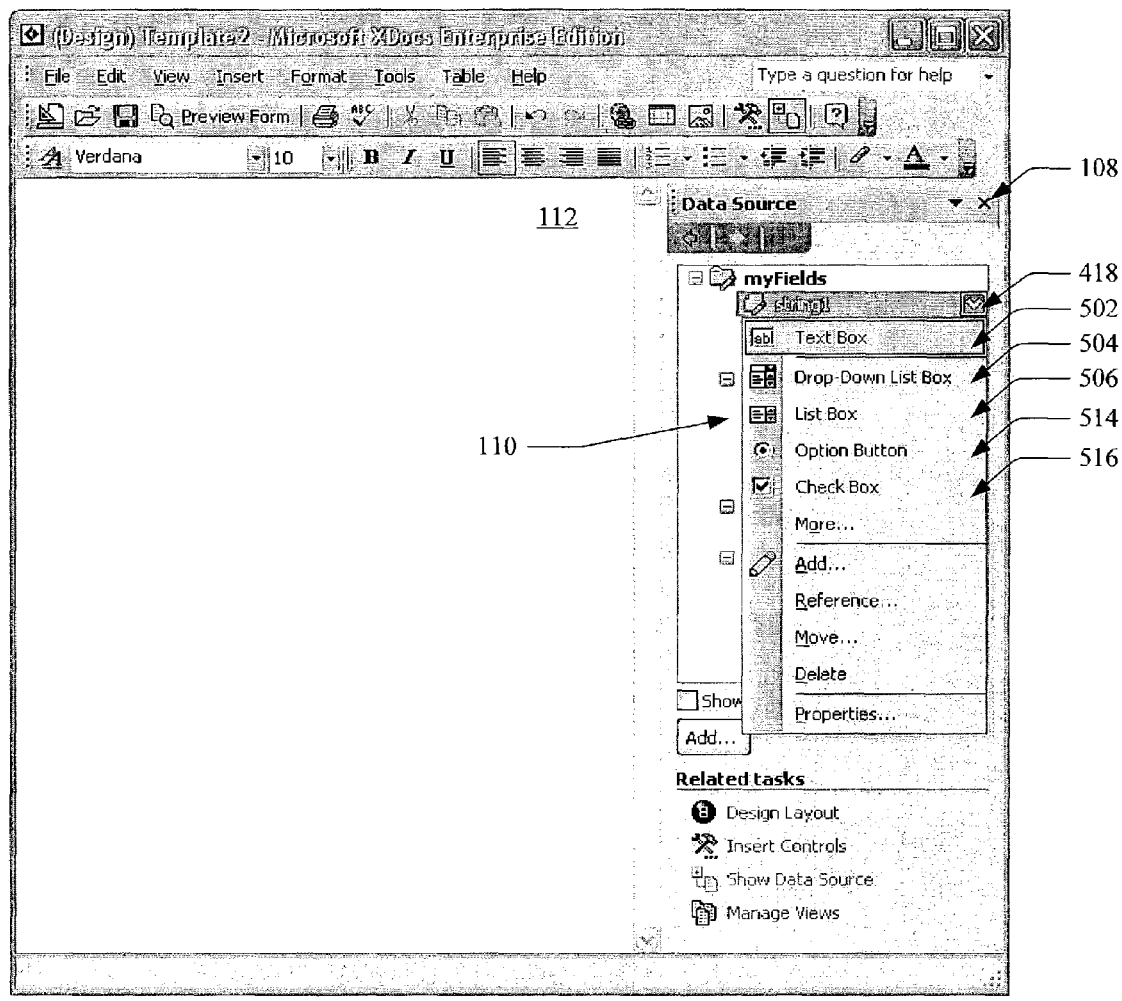
FIG. 5 illustrates an exemplary screen display showing part of a data display area, a component display area, and a blank form-design area.

FIG. 5 illustrates an exemplary component display area 110 that is depicted upon selection of the "string1" node 418 in the data display area 108. The component display area 110 is illustrated as a pop-up menu or list that is positioned just beneath the selected data item and overlies the data display area 108. The component display area 110 contains a list of components that are associated with the selected node 418. That is, each component set forth how the selected part of the hierarchical data could be represented in the electronic form. In this example, the selected "string1" node 418 can be represented by such components as a text box 502, a drop-down list box 504, a list box 506, an option button 514, a check box 516, and so on. The component display area 110 may further include other menu options that enhance the usability for the designer. These options may be general or context specific. Representative options "Add", "Reference", "Move", "Delete", and "Properties" are illustrated in FIG. 5.

When a selection is made, the component display area 110 can present a restriction of the entire library of components known to the system 100. In such a case, the component display area 110 presents a scrollable list or some other mechanism that allows the designer to move through the library and select the desired component. Alternatively, the system 100 can display a reduced set of components that are associated with the selected portion of the hierarchical data. The system 100 identifies which components are associated with a selected portion of hierarchical data according its structure. Thus, if the structure of the portion of hierarchical data allows for storage of only textual data, the system will provide as a default only those components that allow for entry of just textual data. Likewise, if the structure of a portion allows for multiple fields of data, the system will provide to a designer components allowing for multiple fields, such as components allowing for repeating sections and/or a repeating table, like the drop-down list box 504 and the list box 506 of FIG. 5.

Components may be constructed in various ways. Components can be written in a transformation-language. These transformation-language components are code that can be used to transform pieces of markup-language data (a type of hierarchical data) into visual and/or structural fields in an electronic form that are consistent with the structure of the markup-language data. Examples of transformation-language components include files, applets, or other code written in Cascading Style-Sheet Language (CSS) and xTensible Style-sheet Language Transformation (XSLT) languages.

In one implementation, transformation-language components are written in XSLT. XSLT components include those shown in the component display area 110: the text box 502, the drop-down list box 504, the list box 506, the option button 514, and the check box 516. These components in the component display area 110 are represented with icons that approximate the data-entry fields that the components can be used to create in an electronic form.

For example, if a designer chooses a piece of the markup-language data and the piece has only Boolean information or a structure allowing for only Boolean information (e.g., yes or no) (e.g., the "boolean2" node 44 in FIG. 4), the system 100 will display components compatible with the Boolean information and/or structure. The option button 514 or the check box 516 in the components display area 110 of FIG. 5 are examples of compatible components.

Components, whether transformation-language components or otherwise, can be used to create operable fields in electronic forms. Operable fields, such as data entry fields, when integrated into an electronic form, can display or receive information. The information received can be input by a user of an electronic form containing the data-entry field or the information can be copied (automatically or otherwise)

from a data source of hierarchical data containing the information. The "Purpose" data-entry field 208 of FIG. 2, is one example of a data-entry field.

The components associated with the selected part of the hierarchical data, whether a transformation-language component or otherwise, are displayed in component display area 110 so that a designer can chose between them. Components do not need to be displayed, however, if one is chosen by the system 100, such as by a particular component being a default choice or if there is only one component associated with a selected portion of hierarchical data.

In one implementation, the system 100 chooses the component (such as by intelligently determining a component most likely to be desired based on the designer's history of choosing or an algorithm), lessening the need for displaying multiple components unless a designer requests.

Choosing a Component and Other Preferences

At block 308, the system 100 enables the designer to choose one of the components that is associated with the selected portion of hierarchical data. The designer can make this choice using similar user interface techniques that are employed to select a particular portion of hierarchical data. The system 100 can, for instance, enable a designer to select a component by clicking on an icon or text for a component in the component display area 110 (FIG. 5). Alternatively, the system 100 can enable a designer to drag and drop a component from the component display area 110 to the form-design area 112, thereby choosing the component and the placement of the component on the form-design area 112. The system 100 then displays the selected component on the form-design area 112. The selected component can be displayed at a place on the form-design area 112 where a designer selects, or placed where it will not obscure another component on the form-design area 112.

Figure 6:
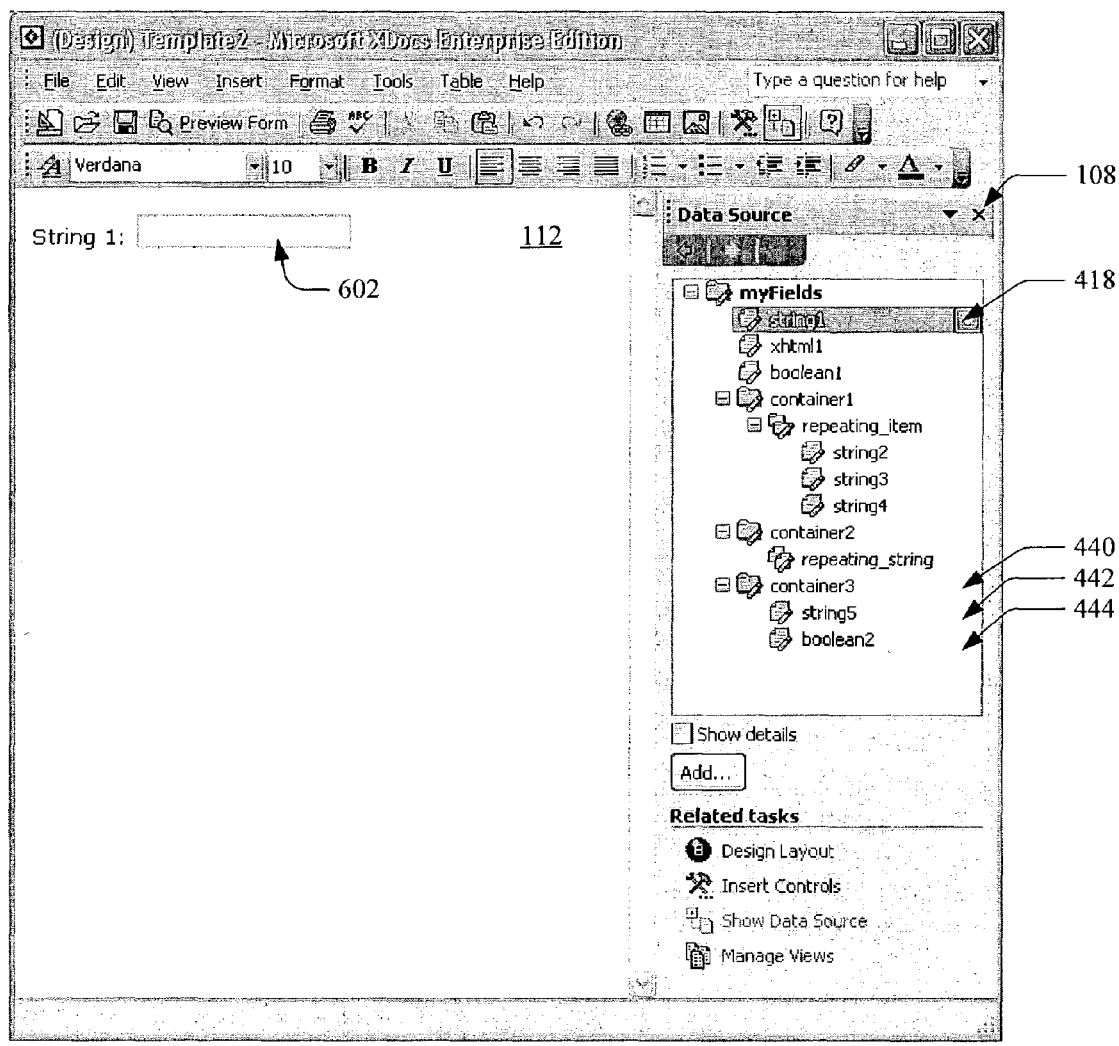
FIG. 6 illustrates an exemplary screen display showing a data display area and a form-design area.

Continuing our example, after the designer selects the string1 node 418 in the data display area 108 (FIG. 4) to invoke the list of components in component display area 110 (FIG. 5), the designer can choose one of the components in component display area 110. In this example, the designer chooses the text box 502 and identifies where the field created with the component is to be positioned in the form-design area 112. This can be done by dragging and dropping the component from the list 110 the form-design area 112, such as the upper left hand corner of form-design area 112 as shown in FIG. 6. The forms-designer application 126 will display the selected text box 502 component substantially as it will appear as an operable field (a text box representation 602, which has the corresponding name "String 1").

However and wherever placed, components generally can be moved and altered by a designer to allow the designer to create an electronic form to match the designer's preference. In one implementation, the system 100 enables a designer to place a component onto the form-design area 112 wherever the designer chooses. This allows the designer freedom to easily organize and create a view (and eventually an electronic form) of one or more components on the form-design area 112.

The system 100 enables a designer not only to choose a particular component, but also other preferences. These preferences can include the placement on the form-design area 112 of each component. These preferences can also include alterations to the components, like the size, font, color, orientation, and the like.

The system 100 also allows a designer to request changes to the form-design area 112 that are not related to components, such as adding text and graphics to the form-design area 112 (such as the header "Travel Itinerary" shown in FIG. 2's example of the form-design area 112). In one implementation, these preferences can include most of the preferences available to a user of a typical word-processing program.

A designer can choose additional parts of an arrangement of hierarchical data and select additional components associated with the chosen parts of hierarchical data to add to the form-design area 112. Continuing the above example, after the text box representation 602 is displayed on the form-design area of FIG. 6, a designer could continue to select the same or another portion of the hierarchical data in the data display area 108 and position the corresponding component onto the form.

Figure 7:
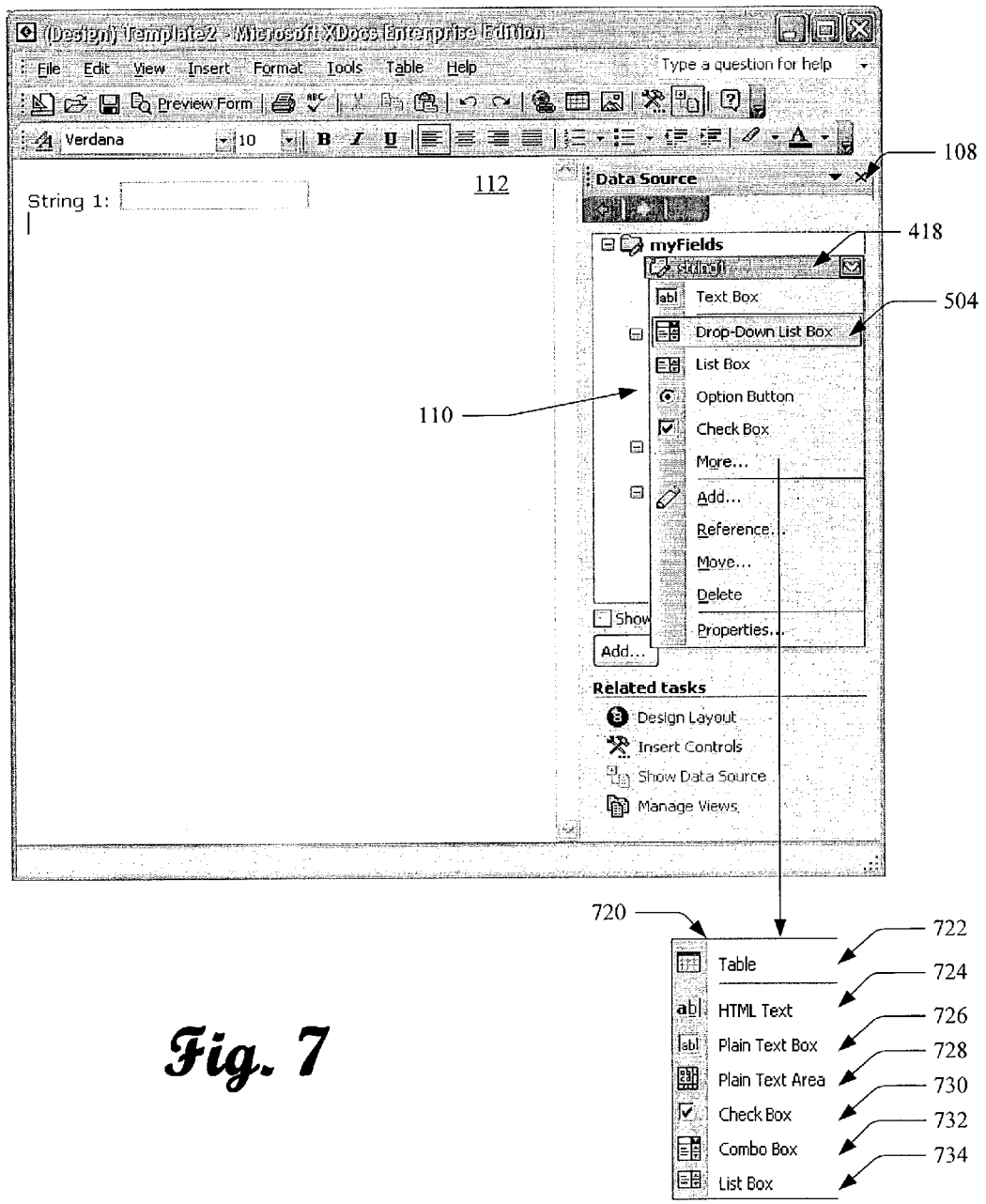
FIG. 7 illustrates an exemplary screen display showing a data display area, an auxiliary component display area, a component display area, and a form-design area.

FIG. 7 shows an example of a designer selecting the "string1" node 418 and then choosing a different component, in this case a drop-down list box 504 from the component display area 110. This example also illustrates another feature, in that the selection of a component may invoke another menu that presents further design options for the selected component. Here, selection of the drop-down list box 504 causes a secondary or auxiliary component display area 720 to be depicted on the screen (although it is illustrated in FIG. 7 off the screen for clarity and purposes of discussion in relation to the underlying areas 110 and 108. The location of this display area 720 is configurable, and may be located just beneath the selected drop-down list box item in display area 110, or elsewhere. The auxiliary component display area 720 includes various component alternatives for implementing the drop-down list box 504, including a table 722, an HTML text 724, a plain text box 726, a plain text area 728, a check box 730, a combo box 732, and a list box 734.

Figure 8:
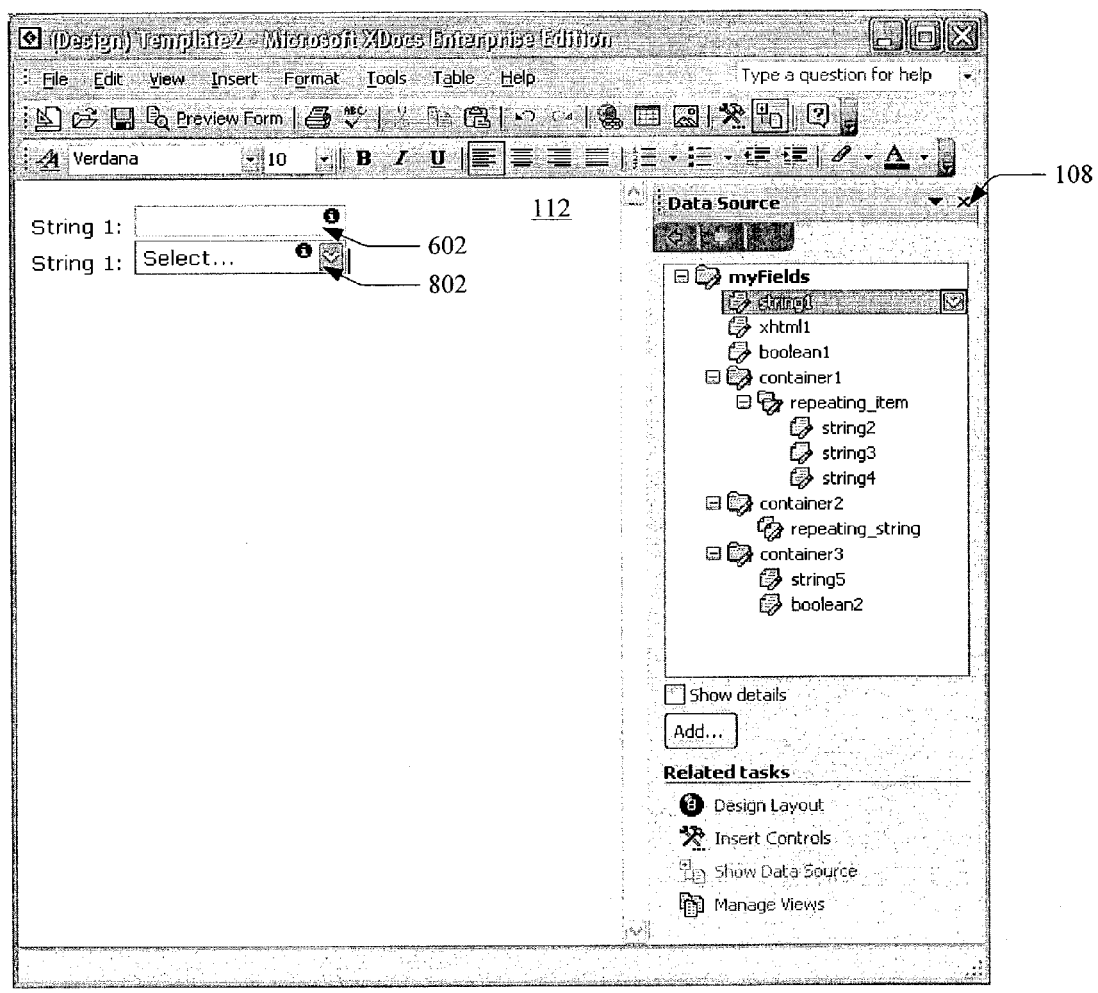
FIG. 8 illustrates an exemplary screen display showing a data display area and a form-design area.

From this auxiliary list, suppose the designer chooses the combo box 732 and positions that component onto the form-display area 112 just beneath the text box representation 602. The forms-designer application 126 uses the selected combo box 732 to represent what will be an operable drop-down list data-entry field in the electronic form (a drop-down representation 802 shown in FIG. 8). Since the component is derived from the "string1" node 418 in data display area 108, the drop-down representation 802 is initially given the name "String1". This name can be subsequently edited, if the designer so desires.

A designer can continue to add components and make alterations to the form-design screen 112. By allowing additions and alterations to the form-design screen 112, the system 100 enables a designer to easily and intuitively create an electronic form built to the designer's preferences. A designer could, for example, continue to add components and make alterations to the components and form-design area 112 until the designer has created a form-design area like the form-design area 112 of FIG. 2, entitled "Travel Itinerary."

Generating an Electronic Form

At block 310, the system 100 generates an electronic form. Components placed within the form-design area 112 are used to generate an electronic form. The electronic form is the product of the placement of various components on the form-design area 112, and can include where the components were placed, how they were altered, and any stylistic changes made to how the components are displayed on or to the form-design area. Once created, the electronic form visually mimics the look of the form-design area at the time the designer decided to create the electronic form. How the system 100 generates an electronic form will be set forth in greater detail below.

Techniques for Creating Electronic Forms

Various implementations of a form-designing process are set forth below. The form designing process can begin with a generalized instance process 900, and can include a process 1000 for rendering transformation-language components and generating a transformation-language document from an annotated rendering-language document.

Creating a Generalized Instance

Figure 9:
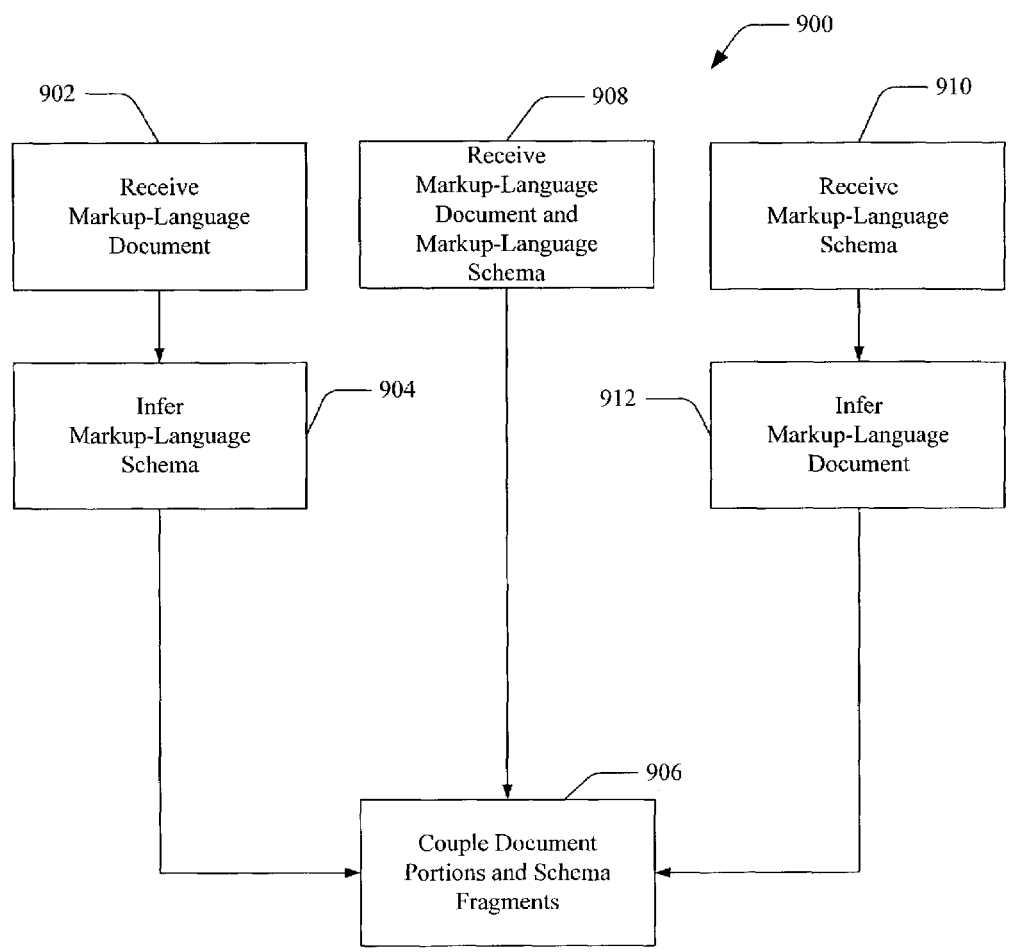
FIG. 9 is a flow diagram of an exemplary process for coupling a markup-language document and schema.

FIG. 9 sets forth a process 900 for creating a generalized instance from one or both of a markup-language document and a markup-language schema. A generalized instance contains hierarchical data. The process 900 is illustrated as a series of blocks representing individual operations or acts performed by the system 100. The process 900 may be implemented in any suitable hardware, software, firmware, or combination thereof. In the case of software and firmware, the process 900 represents a set of operations implemented as computer-executable instructions stored in memory and executable by one or more processors.

Three ways to create a generalized instance are set forth in process 900. In the first, the system 100 receives only a markup-language document. In the second, the system 100 receives both a markup-language document and its markup-language schema. In the third, the system 100 receives only a markup-language schema.

In the first way, the system 100 creates a generalized instance from only a markup-language document. The system 100 does so following blocks 902, 904, and 906 of FIG. 9.

In the block 902, the system 100 receives a markup-language document without its associated schema. The markup-language document received is a document containing hierarchical data that conforms to a markup-language schema, but the markup-language schema is not known. To determine or fabricate a schema for the markup-language document, the system 100 analyzes the structure in which the markup-language document conforms and/or investigates clues or references in the markup-language document.

With this information, the system 100 infers a markup-language schema according to the block 904. The system 100 can infer the markup-language schema by building it based on the structure of the markup-language document. The system 100 can also infer the markup-language schema by searching sources containing schemas until it finds a schema matching the structure of or reference in the markup-language document. The World Wide Web Consortium ("W3C") is a source for the language used to describe some markup-language schemas.

In block 906, the system 100 couples the markup-language document and its associated markup-language schema. Either of the markup-language document or markup-language schema may have been inferred. The generalized instance contains a hierarchical arrangement of data with each part of the hierarchical data also containing or referencing each part of the schema that governs that part of the hierarchical data.

In one implementation, the system 100 couples the markup-language document and its schema modularly. The system 100 analyzes the structure of the markup-language document and the structure allowed by its schema to determine how the markup-language document can be modularized. The system 100 breaks the markup-language document into parts (referred to sometimes as "nodes" when the generalized instance is arranged as a tree). Based on each of these parts of the markup-language document, the system 100 associates pieces of the schema that govern the structure of a particular part to that particular part. By so doing, the markup-language document and its schema can be broken down into parts. These modular parts each contain a part of the markup-language document and a part of the markup-language schema governing that part.

These parts are then arranged into a generalized instance. The generalized instance contains an arrangement of parts, each part containing a piece of the markup-language document and piece of the markup-language schema governing that piece of the markup-language document.

For example, in FIG. 6, a "container3" node 440 is a part of a larger markup-language document (entitled "My Fields") associated with a markup-language schema. The "container3" node 440 contains information on its own and the information of a "string5" node 442 and "boolean2" node 444. The "container3" node 440 also, if it is part of a generalized instance, contains the part of the schema associated with the markup-language document that governs the container3 node 440, the string 5 node 442, and the boolean2 node 44. Thus, that part of the markup-language document that is called the container3 node 440 is modular by virtue of being coupled with the schema governing it. So each part of a markup-language document that is coupled with its markup-language schema is independent and modular. The generalized instance is a compilation of all the coupled parts.

One of the benefits of creating a generalized instance is that the system 100, when it receives a selection of one part of hierarchical data that is modularized into a generalized istance, can more easily associate that selected part to one or more components. The system 100, with just the selected part, can determine what rules govern that part, such as the type of information the part can contain, how it is arranged, how it can be used, and the like. Thus, the system 100 can more easily (and in some cases more accurately) associate particular components with the selected part of the hierarchical data when it is modularized into a generalized instance.

In one implementation, a generalized instance describes, for each part of a hierarchical data file, every possible type of information that can be contained within that part. With this information, the system 100 can more easily determine which components to associate with a selected part of hierarchical data that have been coupled or modularized into a generalized instance.

In the second way to create a generalized instance, the system 100 creates a generalized instance from a markup-language document and its markup-language schema. The system 100 does so following blocks 908 and 906 of FIG. 9.

In the block 908, the system 100 receives a markup-language document and its associated schema. The markup-language schema describes the rules and/or structure governing the markup-language document received but can also govern other markup-language documents as well. With the markup-language document and its schema, the system 100 creates a generalized instance as set forth in block 906 above.

In the third way, the system 100 creates a generalized instance from only a markup-language schema. The system 100 does so following blocks 910, 912, and 906 of FIG. 9.

In the block 910, the system 100 receives a markup-language schema without a conforming markup-language document. This markup-language schema can be one of many different types, including a schema not conforming to a W3C standard or one having an arbitrary syntax.

The system 110, through the forms-designer application 126, analyzes the markup-language schema to determine the range of markup-language documents that can conform to the markup-language schema (block 912). One of the powerful aspects of the forms-designer application 126 is that it can determine this range of documents even when the markup-language schema defines an arbitrary syntax or does not conform to a known standard. This ability enables the forms-designer application 126 to create generalized instances for these schemas. With these generalized instances, it can build electronic forms for use with data files having non-standard or arbitrary structures.

With the range of markup-language documents that can conform to the markup-language schema, the system 100 infers a markup-language document that conforms to the markup-language schema. With the markup-language document and its schema, the system 100 creates a generalized instance as set forth in block 906 above.

Rendering-Language and Transformation-Language Documents

FIG. 10 sets forth a process 1000 for rendering of transformation-language components and generating a transformation-language document.

The process 100 is illustrated as a series of blocks representing individual operations or acts performed by the system 100. The process 1000 may be implemented in any suitable hardware, software, firmware, or combination thereof. In the case of software and firmware, the process 100 represents a set of operations implemented as computer-executable instructions stored in memory and executable by one or more processors.

The process 1000 begins with a block 1002, where they system 100 prepares hierarchical data into a generalized instance, as set forth in the description of the process 900. The process 1000 can start with a generalized instance through block 1002 or otherwise, so long as the hierarchical data is displayed.

In the following description of the process 1000, hierarchical data is sometimes referred to as a markup-language document and components as transformation-language components. It is to be understood that these terms are used to aid in the clear exposition of the process 1000, and are not in any way limiting of the process 1000.

Creating and Annotating a Rendering-Language Document

In block 1004, the system 100 creates and/or annotates a rendering-language document. A rendering-language document is a document or file that, when executed (alone or in conjunction with other files or applications) displays a view on a screen. One example is a file that displays a webpage. This type of file gives a reader a view of information, such as through text, graphics, and the like. A rendering-language document is not the same thing as an electronic form, but rather is a view of what an electronic form can look lie. Thus, a rendering-language document can create views seen in the form-design area 112.

As part of the block 1004, the system 100 creates a rendering-language document by applying one or more components on one or more parts of hierarchical data. In the following description, the components are written in a transformation-language and the hierarchical data includes a markup-language document.

Rendering-language documents can be written in HTML or XHTML document, other machine-language documents, or other documents adept at viewing or displaying. To create rendering-language documents written in XHTML, the system 100 applies one or more XSLT transformation-language components on one or more nodes or portions of an XML document.

Once the system 100 creates a rendering-language document, the system 100 can annotate the rendering-language document to make it easier to create an electronic form from the rendering-language document.

These annotations include two primary types. One annotation indicates the type of transformation-language component selected. Another annotation indicate the node of the tree of hierarchical data selected (or part of the hierarchical data). The placement chosen for each component on the form-design area 112 can be part of the rendering-language document, but is not generally considered an annotation. Thus, the product to this point is an annotated rendering-language document (such as an XHTML document) that can render (shows a vie of) the selected transformation-language component (such as an XSLT component) on the form-design area 112 (such as is set forth in FIG. 2).

Annotating the rendering-language document by adding this information enriches the rendering-language document so that it contains information for the system 100 to later analyze the rendering-language document to help create an electronic form. The system 100 can, for example, identify the annotations in an annotated rendering-language document to create an electronic form visually mimicking the view created by the annotated rendering-language document. Thus, in this example, the system 100 can create an electronic form mimicking the view of the transformation-language components set forth and manipulated by a designer in the form-design area 112 (such as set forth in FIG. 2. With the electronic form a user can enter information into fields of the electronic form that can be retained by a file. The file, in some cases, mimics the structure of the hierarchical data file from which the electronic form was created, such as an XML document.

Rendering Transformation-Language Components with a Rendering-Language Document

Once this rendering-language document is created and/or annotated, it can be used by the system 100 to render transformation-language components, as set forth in a block 1006. Typically, the system 100 renders the transformation-language components on a display, such as the form-design area 112 of the screen 102 of FIG. 1.

Based on the structure of the rendering-language document, the system 100 can render transformation-language components in various ways. For example, the system 100 can render the text box 502 of FIG. 5 (which is a component) to look like the box set forth in FIG. 6 as the text box representation 602.

In FIG. 2, for instance, the system 100 renders transformation-language components with a rendering-language document to create the view set forth in the form-design area 112, which mimics how the electronic form will appear.

Thus, using XSLT transformation-language components, XML hierarchical data, and XHTML rendering-language documents as examples, once the system 100 receives from a designer a selection and placement of one of a list XSLT transformation-language components associated with a selected node of the XML document, such as by the designer clicking on the XSLT transformation-language component's icon or text and dragging the icon or text over to the form-design area 112, the system 100 renders the transformation-language component.

To do so, the system 100 applies the selected XSLT transformation-language component to the XML hierarchical data represented by the selected node or portion. By so doing, the system 100 creates an XHTML document that renders a visual representation of the XSLT transformation-language component on the form-design area 112 at the place the designer selected.

Compiling Transformation-Language Components into a Transformation Language Document In block 1008, the system then determines, from the annotated rendering-language document, the transformation-language components used and the location of the nodes in the markup-language document that are associated with each transformation-language component rendered. In block 1012, the system generates a transformation-language document from this information (as well as the information regarding the placement style, and formatting of transformation-language components included within the rendering-language document), either after or independent of a designer saving the form-design screen 112 (block 1010).

The transformation-language document is the document ultimately created and saved by the system 100, while the rendering-language document is no longer needed. This is because the transformation-language document can create a view of hierarchical data mimicking the view created by the rendering-language document that was used to create the transformation-language document. The transformation-language document, when applied to a markup-language document having the same schema as the one from which the parts were chosen by the designer, will create an electronic form visually mimicking the rendering made by the rendering-language document. The electronic form created, however, can contain fields that can be populated by information from a user or from another markup-language document.

The electronic form created can be used by a user to key in information into fields, such as the purpose of an appointment (see the form-design area 112 of FIG. 2). The electronic form created can also have its fields populated by other hierarchical data files, thereby reducing the labor needed to key-in information by hand. One way in which an electronic form can be created with one or more fields already populated, is by applying a transformation-language document to a markup-language data file containing information. The result can be an electronic form with the fields filled where nodes of a markup-language data file corresponding to those fields contain information.

Thus, a designer not knowledgeable about transformation-language documents or programming can, in an easy-to-us way, create an electronic form from a markup-language document. This electronic form also can be flexibly created, allowing a designer to choose various transformation-language components, change the orientation and placement of the transformation-language components, change the font, color, size, and make other word-processor-like changes to the transformation-language components, so that the electronic form will have the structure and look intended by the designer.

The system 100 can even create XSLT transformation-language documents, which are especially complex. In this case, a designer having little knowledge about the XSLT language can create, using XSLT transformation-language components, XML hierarchical data, and an XHTML rendering-language document as examples, an XSLT transformation-language document.

A Computer System

FIG. 11 shows an exemplary computer system that can be used to implement the processes described herein. Computer 142 includes one or more processors or processing units 114, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory 146 includes read only memory (ROM) 150 and random access memory (RAM) 152. A basic input/output system (BIOS) 154, containing the basic routines that help to transfer information between elements within computer 142, such as during start-up, is stored in ROM 150.

Computer 142 further includes a hard disk drive 156 for reading from and writing to a hard disk (not shown), a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the bus 148 by an SCSI interface 166 or some other appropriate interface. The drives and their associated computer-readable media provide nonvolatile storage of computer-readable instructions, data structures, program modules and other data for computer 142. Although the exemplary environment described herein employs a hard disk, a removable magnetic disk 160 and a removable optical disk 164, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 156, magnetic disk 160, optical disk 164, ROM 150, or RAM 152, including an operating system 170, one or more forms-designer application 172, other program modules 174, and program data 176. A user may enter commands and information into computer 142 through input devices such as a keyboard 178 and a pointing device 180. Other input devices (not shown) may include a microphone, joystick, game pad, satellite dish, scanner, or the like. These and other input devices are connected to the processing unit 144 through an interface 182 that is coupled to the bus 148. A monitor 184 or other type of display device is also connected to the bus 148 via an interface, such as a video adapter 186. In addition to the monitor, personal computers typically include other peripheral output devices (not shown) such as speakers and printers.

Computer 142 commonly operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142. The logical connections depicted in FIG. 11 include a local area network (LAN) and a wide area network (WAN) 194. Such networking environments are commonplace in offices, enterprise-wide computer networks, intranets, and the Internet.

When used in a LAN networking environment, computer 142 is connected to the local network through a network interface or adapter 196. When used in a WAN networking environment, computer 142 typically includes a modem 198 or other means for establishing communications over the wide area network 194, such as the Internet. The modem 198, which may be internal or external, is connected to the bus 148 via serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various time in different storage components of the computer, and are executed by the data processor(s) of the computer

CONCLUSION

The above-described system and method for generating electronic forms allows a designer to easily create electronic forms from a file of hierarchical data, even if the designer has only very basic skills. The above-described system and method also allows a designer to create, with the click of a mouse, XSLT files capable of transforming XML documents into XHTML files simply by clicking on parts of an XML document and/or its schema. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable storage media storing computer-executable instructions that, when executed by a computing device, perform acts comprising:
displaying hierarchical data in a first area of a screen;
facilitating selection of a first portion and a second portion of the hierarchical data;
receiving selection of the first portion of the hierarchical data;
displaying, in a second area of the screen and in response to receiving selection of the first portion, a first visual representation of a first operable field corresponding to the first portion;
receiving selection of the second portion of the hierarchical data; and
displaying, in the second area of the screen along with the first visual representation of the first operable field and in response to receiving selection of the second portion, a second visual representation of a second operable field corresponding to the selected second portion, the acts of displaying the first visual representation and the second visual representation being effective to build a visual representation of an electronic form having the first operable field and the second operable field wherein the act of displaying the hierarchical data displays the hierarchical data in a tree arrangement of XML data having portions represented by nodes in the tree arrangement, the act of receiving selection of the first portion receives selection of a first node, and the act of receiving selection of the second portion receives selection of a second node.

2. The computer-readable storage media of claim 1, further comprising:
generating an electronic form having the first operable field and the second operable field.

3. The computer-readable storage media of claim 1, further comprising:
generating an electronic form that visually mimics the visual representation.

4. The computer-readable storage media of claim 3, wherein the electronic form is created using an XSLT file.

5. The computer readable storage media of claim 1, wherein the act of displaying the first visual representation displays a first XSLT component based on the first node, and the act of displaying the second visual representation displays a second XSLT component based on the second node.

6. The computer-readable storage media of claim 5, further comprising annotating an XHTML document to include a first reference to the first XSLT component and a second reference to the second XSLT component.

7. The computer-readable storage media of claim 6, wherein the act of displaying the first XSLT component renders the first XSLT component based on the first reference in the annotated XHTML document and the act of displaying the second XSLT component renders the second XSLT component based on the second reference in the annotated XHTML document.

8. The computer-readable storage media of claim 5, further comprising identifying the first XSLT component based on a schema governing the first node.

9. One or more computer-readable storage media storing computer-executable instructions that, when executed by a computing device, perform acts comprising:
present a first screen area displaying hierarchical data in a tree arrangement of XML data having portions represented by nodes in the tree arrangement;
provide an interface to enable two iterations of:
selecting a portion of the hierarchical data;
through a node in the tree arrangement and
arranging a visual representation of an operable field corresponding to the selected portion of the hierarchical data,
wherein said portion, node, visual representation, and operable field in the first iteration is a first portion, first node, first visual representation, and first operable field, respectively, and in the second iteration is a second portion, second node, second visual representation, and second operable field, respectively, and
present a second screen area, in response to each of the iterations of selecting and arranging, to display the first and second visual representations of the first and second operable fields in the selected visual arrangement effective to modularly generate a visual representation of an electronic form having said first and second operable fields.

10. The computer-readable storage media of claim 9, further comprising generating the electronic form visually represented in the second screen area.

11. The computer-readable storage media of claim 10, wherein the electronic form comprises the first and second operable fields represented by the first and second visual representations in the second screen area and in the selected visual arrangement of the first and second visual representations of the first and second operable fields displayed in the second screen area.

12. The computer-readable storage media of claim 9, wherein the interface further enables selecting to alter the selected visual arrangement of the first and second visual representations in the second screen area.

13. The computer-readable storage media of claim 9, wherein the interface further enables selecting to alter an operation of one of the first and second operable fields by altering the visual representation of that operable field.

14. A method comprising:

displaying hierarchical data in a first screen area;

receiving input selecting a first portion of the hierarchical data;

displaying, in a second screen area in response to receiving input selecting the first portion of the hierarchical data, a first visual representation of a first operable field corresponding to the first selected portion of the hierarchical data;

receiving, after displaying the first visual representation, input selecting a second portion of the hierarchical data;

receiving input visually arranging at least a second visual representation of a second operable field corresponding to the second selected portion of the hierarchical data; and displaying, in response to receiving input selecting the second portion of the hierarchical data and receiving input visually arranging the second visual representation, the second visual representation in the second screen area in the selected visual arrangement effective to enable a user to build a visual representation of an electronic form having the first operable field and the second operable field wherein the act of displaying the hierarchical data displays the hierarchical data in a tree arrangement of XML data having portions represented by nodes in the tree arrangement, the act of receiving input of the first portion receives selection of a first node, and the act of receiving input of the second portion receives selection of a second node.

15. The method of claim 14, further comprising generating the electronic form visually mimicking the second screen area and having the first operable field and the second operable field.

16. The method of claim 14, further comprising receiving input altering the visual representation of the first operable field or the second operable field in the second screen area.

17. The method of claim 16, wherein the input altering the visual representation corresponds to an alteration to an operation of the first or second operable field and further comprising generating the electronic form having the alteration to the operation of the first or second operable field.

* * * * *